United States Patent
Tanaka et al.

(10) Patent No.: US 10,249,894 B2
(45) Date of Patent: Apr. 2, 2019

(54) FUEL CELL SYSTEM

(71) Applicant: NISSAN MOTOR CO., LTD., Yokohama-shi, Kanagawa (JP)

(72) Inventors: Daiki Tanaka, Kanagawa (JP); Tatsuya Yaguchi, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/747,656

(22) PCT Filed: Jul. 28, 2015

(86) PCT No.: PCT/JP2015/071379
§ 371 (c)(1),
(2) Date: Jan. 25, 2018

(87) PCT Pub. No.: WO2017/017786
PCT Pub. Date: Feb. 2, 2017

(65) Prior Publication Data
US 2018/0219238 A1  Aug. 2, 2018

(51) Int. Cl.
*H01M 8/04* (2016.01)
*H01M 8/24* (2016.01)
*H01M 8/06* (2016.01)
*H01M 8/04537* (2016.01)
*H01M 8/04858* (2016.01)
*H01M 8/2495* (2016.01)
*H01M 8/04302* (2016.01)
*H01M 8/04225* (2016.01)
(Continued)

(52) U.S. Cl.
CPC ..... *H01M 8/04559* (2013.01); *H01M 8/0432* (2013.01); *H01M 8/0488* (2013.01); *H01M 8/04225* (2016.02); *H01M 8/04302* (2016.02); *H01M 8/04716* (2013.01); *H01M 8/2465* (2013.01); *H01M 8/2495* (2013.01); *H01M 2250/20* (2013.01)

(58) Field of Classification Search
CPC ............... H01M 8/04; H01M 8/04537; H01M 8/04701; H01M 8/0432; H01M 8/24
See application file for complete search history.

(56) References Cited

U.S. PATENT DOCUMENTS 6,294,278 B1 * 9/2001 Wohr .................. B60L 11/1881
429/410
2005/0037249 A1 2/2005 Zizelman et al.
(Continued)

FOREIGN PATENT DOCUMENTS

EP 1507302 A2 2/2005
JP 62-140376 A 6/1987
(Continued)

*Primary Examiner* — Kenneth J Douyette
(74) *Attorney, Agent, or Firm* — Foley & Lardner LLP

(57) ABSTRACT

A fuel cell system includes: a first fuel cell stack; and a second fuel cell stack with lower output voltage than the first fuel cell stack, a pre-switching stack configured by the first fuel cell stack or the second fuel cell stack, a step-up stack configured by the first fuel cell stack or the second fuel cell stack, a post-switching stack configured by at least the first fuel cell stack, and steps up voltage of the step-up stack with the pre-switching stack connected to the load and then switches to a connection state where the post-switching stack is connected to the load.

13 Claims, 14 Drawing Sheets

(51) Int. Cl.
*H01M 8/0432* (2016.01)
*H01M 8/04701* (2016.01)
*H01M 8/2465* (2016.01)

(56) References Cited

U.S. PATENT DOCUMENTS

2007/0111061 A1    5/2007  Matsuno et al.
2007/0259230 A1*  11/2007  Berntsen ........... H01M 8/04388
                                                           429/430
2011/0208383 A1*   8/2011  Yamamoto ............ B60W 20/13
                                                           701/22

FOREIGN PATENT DOCUMENTS

| | | |
|---|---|---|
| JP | 2001-229950 A | 8/2001 |
| JP | 2004-171881 A | 6/2004 |
| JP | 2005-19372 A | 1/2005 |
| JP | 2007-250287 A | 9/2007 |
| JP | 2008-288149 A | 11/2008 |
| JP | 2010-140761 A | 6/2010 |

* cited by examiner

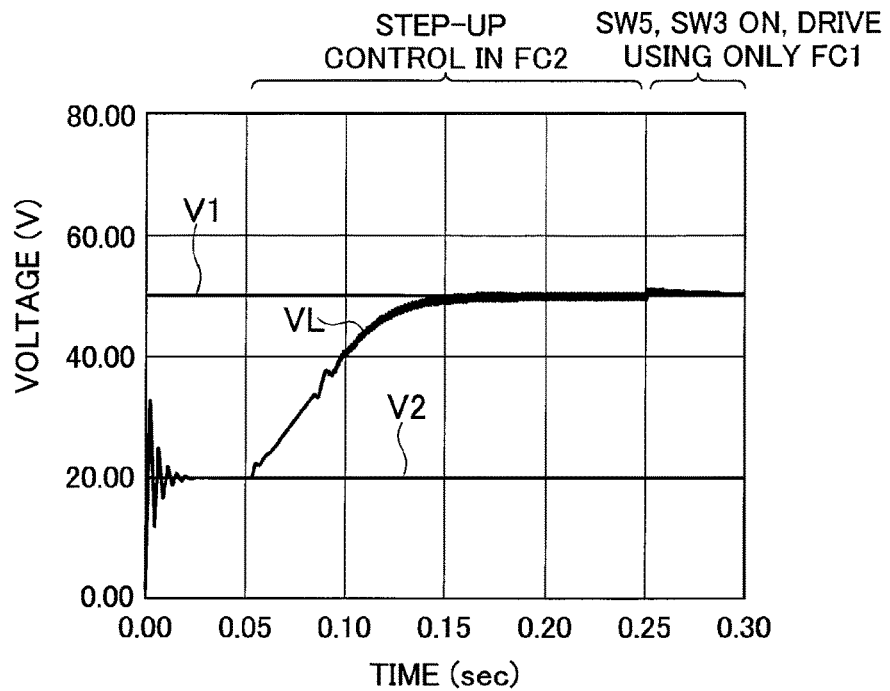
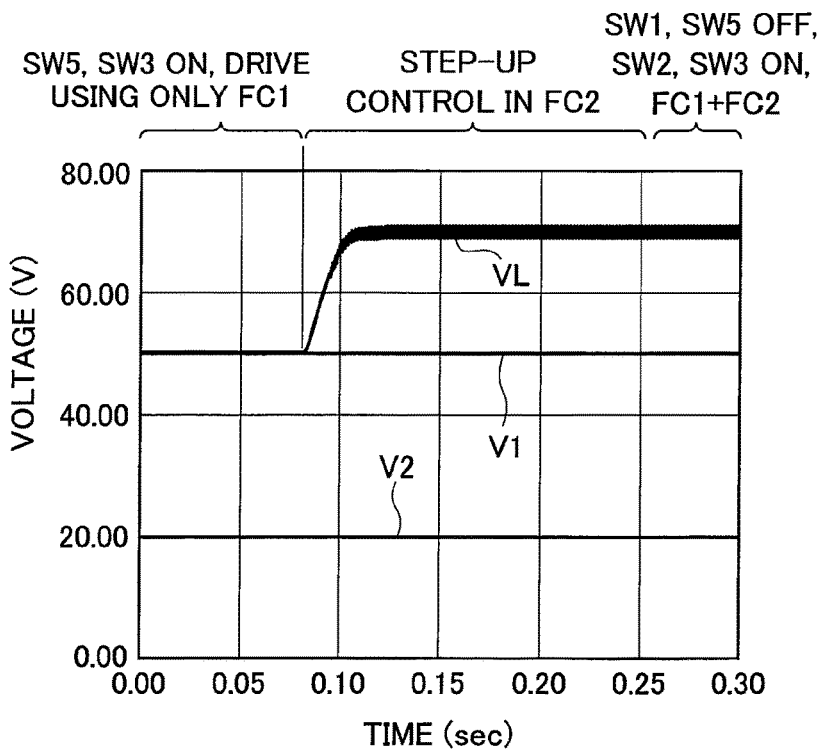

FUEL CELL SYSTEM

TECHNICAL FIELD

The present invention relates to a fuel cell system including multiple fuel cell stacks.

BACKGROUND ART

There is known a technique in which, in a fuel cell system including two fuel cell stacks of a start-up stack and a main stack, start-up is performed by using only the start-up stack and exhaust of the start-up stack is supplied to the main stack to heat the main stack in short time (see Patent Literature 1). The start-up stack is connected to a start-up load during the start-up and is shut down, switched to a standby status, or connected to the main stack when the heating of the main stack is completed.

CITATION LIST

Patent Literature

Patent Literature 1: European Patent Application Publication No. 1507302

SUMMARY OF INVENTION

Technical Problem

However, in the technique described in Patent Literature 1, when a stack connected to the load is changed to another stack, large voltage fluctuation occurs in the load at the moment of changing. Accordingly, there is a risk of causing a rush current or surge voltage. Moreover, when the stacks are connected in series, a current of one stack may flow into the other stack, thereby causing large fluctuation in the total output voltage. An excessive amount of fuel needs to be supplied to the fuel cell stack with large voltage fluctuation to prevent degradation, and this may cause decrease in output efficiency.

In view of the aforementioned problems, an object of the present invention is to provide a fuel cell system which can improve the stability of output voltage.

Solution to Problem

A fuel cell system includes: a first fuel cell stack; and a second fuel cell stack with lower output voltage than the first fuel cell stack, a pre-switching stack configured by the first fuel cell stack or the second fuel cell stack, a step-up stack configured by the first fuel cell stack or the second fuel cell stack, a post-switching stack configured by at least the first fuel cell stack, and steps up voltage of the step-up stack with the pre-switching stack connected to a load and then switches to a connection state where the post-switching stack is connected to the load.

Advantageous Effects of Invention

The present invention can provide the fuel cell system in which the electricity control device has the configuration capable of stepping up the voltage of the fuel cell stack and which can thereby improve the stability of the output voltage.

BRIEF DESCRIPTION OF DRAWINGS

FIG. 11 is a simulation result of the load voltage of the fuel cell system according to the first embodiment of the present invention.

FIG. 12 is a simulation result of the load voltage of the fuel cell system according to the first embodiment of the present invention.

DESCRIPTION OF EMBODIMENTS

Figure 1:
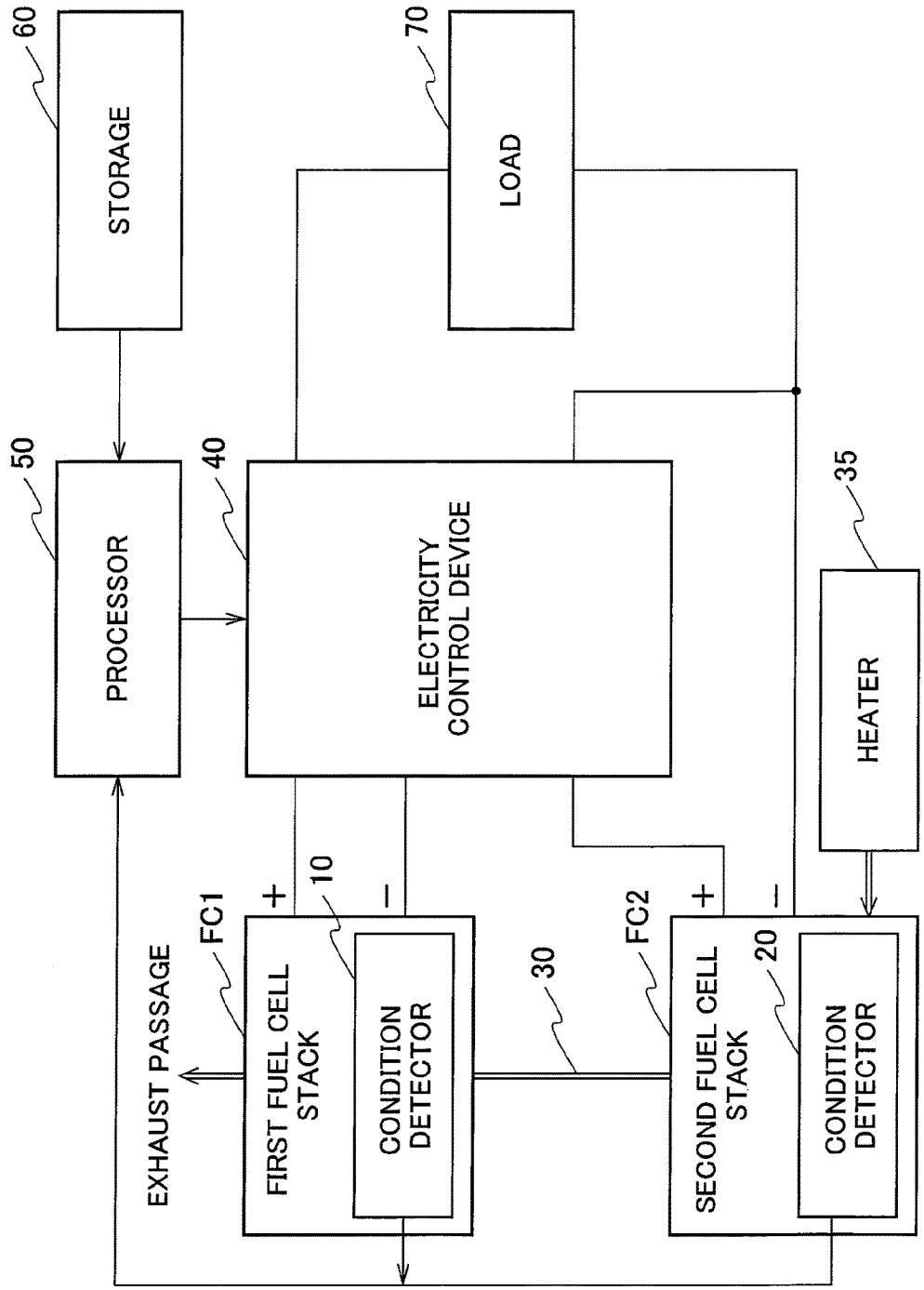
FIG. 1 is a block diagram explaining a configuration example of a fuel cell system according to a first embodiment of the present invention.

Embodiments of the present invention are described with reference to the drawings. In the description of the drawings, the same or similar parts are denoted by the same or similar reference numerals and overlapping description is omitted.

First Embodiment

As illustrated in FIG. 1, a fuel cell system according to a first embodiment of the present invention includes a first fuel cell stack FC1, a second fuel cell stack FC2, an exhaust passage 30, an electricity control device 40, a processor 50, a storage 60, and a load 70. The fuel cell system according to the first embodiment is, for example, a system which supplies electric power of fuel cells as drive power of an electric vehicle. The load 70 corresponds to an inverter, a motor, and the like.

The first fuel cell stack FC1 and the second fuel cell stack FC2 are each configured by, for example, a solid oxide fuel cell (SOFC), a polymer electrolyte fuel cell (PEFC), or the like which generates power by using chemical reaction between oxygen and fuel such as hydrogen, diesel fuel, gasoline, or ethanol. The first fuel cell stack FC1 and the second fuel cell stack FC2 are each a cell stack which is formed by stacking cells each including a fuel electrode (anode), an oxygen electrode (cathode), an electrolyte, a separator, and the like.

The first fuel cell stack FC1 is a main stack which supplies power to the load 70 in a normal mode. The first fuel cell stack FC1 includes a condition detector 10 which detects at least one of output voltage and temperature of the first fuel cell stack FC1. In other words, the condition detector 10 includes at least one of a voltmeter and a thermometer. The condition detector 10 outputs at least one of the detected voltage and temperature to the processor 50 time after time.

The second fuel cell stack FC2 has a smaller power capacity than the first fuel cell stack FC1. In other words, the second fuel cell stack FC2 has lower output voltage than the first fuel cell stack FC1. The second fuel cell stack FC2 includes a condition detector 20 which detects at least one of output voltage and temperature of the second fuel cell stack FC2. In other words, the condition detector 20 includes at least one of a voltmeter and a thermometer. The condition detector 20 outputs at least one of the detected voltage and temperature to the processor 50 time after time. Moreover, the second fuel cell stack FC2 includes a passage used to introduce gas from a heater 35 such as a burner for heating in start-up.

The exhaust passage 30 is a pipe used to supply heat generated in power generation in the second fuel cell stack FC2 to the first fuel cell stack FC1 in the form of exhaust. The exhaust passage 30 heats the first fuel cell stack FC1 by supplying the heat of the second fuel cell stack FC2 and promotes start-up of the first fuel cell stack FC1.

The electricity control device 40 is a circuit which adjusts power of at least one of the first fuel cell stack FC1 and the second fuel cell stack FC2 and supplies the adjusted power to the load 70. An input side of the electricity control device 40 is connected to negative and positive electrodes of the first fuel cell stack FC1 and to a positive electrode of the second fuel cell stack FC2. An output side of the electricity control device 40 is connected to both terminals of the load 70. The negative electrode terminal of the load 70 is connected to a negative electrode of the second fuel cell stack FC2.

The electricity control device 40 has, as operation modes, a mode in which the electricity control device 40 connects one of the first fuel cell stack FC1 and the second fuel cell stack FC2 to the load 70, a high-output mode in which the electricity control device 40 connects the first fuel cell stack FC1 and the second fuel cell stack FC2 in series to the load 70, and a step-up mode in which the electricity control device 40 steps up the voltage of the second fuel cell stack FC2 and supplies the stepped-up voltage to the load 70. Switching to each of the modes of the electricity control device 40 is controlled by the processor 50.

The processor 50 controls operations of the electricity control device 40 and also controls processing required for operations performed by the fuel cell system according to the first embodiment. The processor 50 can be configured by, for example, a microcontroller which is an integrated circuit including a central processing unit (CPU), a memory, an input-output I/F, and the like. In this case, functions of the processor 50 are implemented by causing the CPU to execute a computer program installed in advance in the microcontroller. The microcontroller may also serve as an electronic control unit (ECU) used for other controls associated with the vehicle.

The storage 60 stores a current-voltage characteristic (IV curve) of each of the first fuel cell stack FC1 and the second fuel cell stack FC2. The storage 60 stores current-voltage characteristic at each temperature because the current-voltage characteristic varies depending on the temperature of each of the first fuel cell stack FC1 and the second fuel cell stack FC2. The storage 60 can be configured by a storage device such as a semiconductor memory or a magnetic disk.

Figure 2:
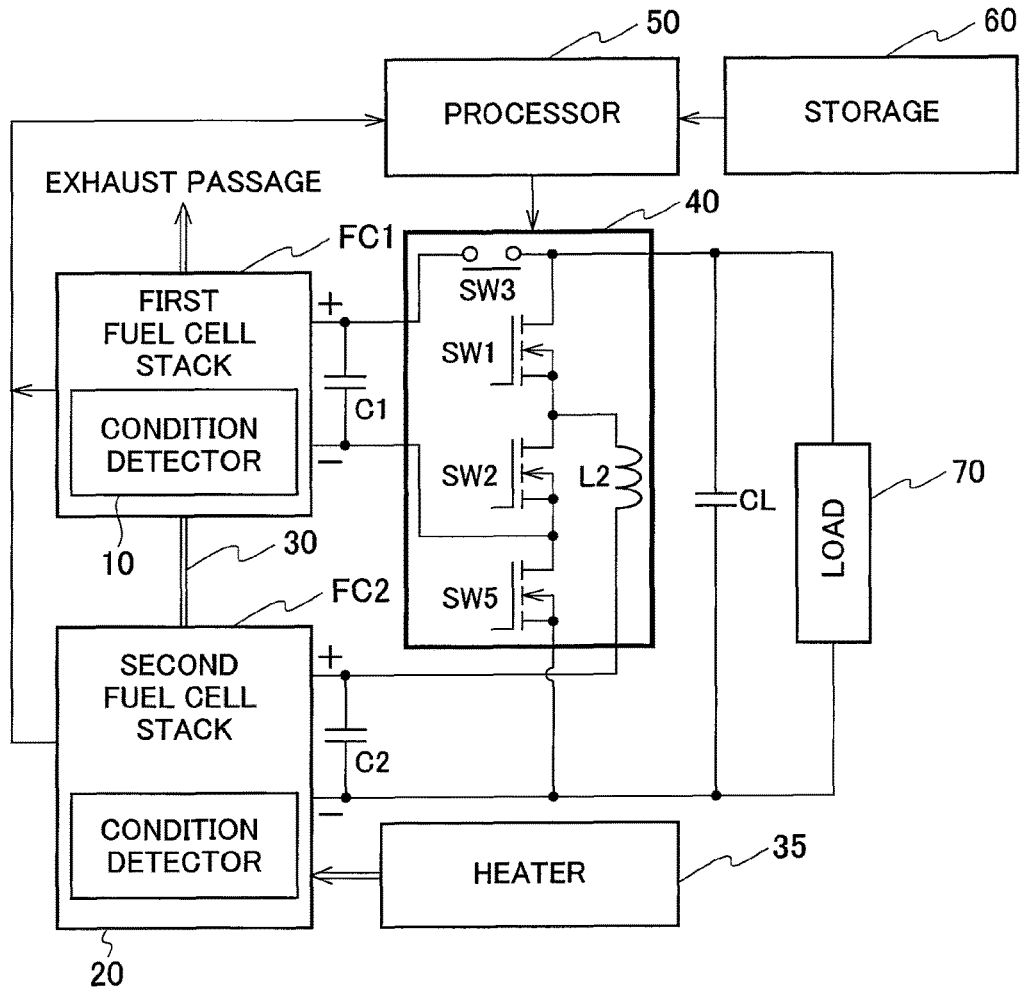
FIG. 2 is a circuit diagram explaining an electricity control device included in the fuel cell system according to the first embodiment of the present invention.

For example, as illustrated in FIG. 2, the electricity control device 40 includes three switching elements SW3, SW1, SW2 which are connected in series in this order between the positive electrode and the negative electrode of the first fuel cell stack FC1 and a switching element SW5 which is connected between the negative electrode of the first fuel cell stack FC1 and the negative electrode of the second fuel cell stack FC2. The electricity control device 40 further includes a reactor L2 connected between the positive electrode of the second fuel cell stack FC2 and a contact point of the switching element SW1 and the switching element SW2.

The switching elements SW1, SW2, SW5 can be each configured by, for example, a semiconductor switching element such as an insulated-gate field-effect transistor (IGFET), an insulated-gate bipolar transistor (IGBT), or a MOS-FET. Gate terminals of the switching elements SW1, SW2, SW5 are connected to the processor 50 and operations thereof are controlled by the processor 50. The switching element SW3 is configured by a mechanical switch which mechanically opens and closes a contact point. An operation of the switching element SW3 is controlled by the processor 50.

Moreover, the fuel cell system according to the first embodiment includes a capacitor C1 connected between the positive electrode and the negative electrode of the first fuel cell stack FC1, a capacitor C2 connected between the positive electrode and the negative electrode of the second fuel cell stack FC2, and a capacitor CL connected between both terminals of the load 70.

Figure 3:
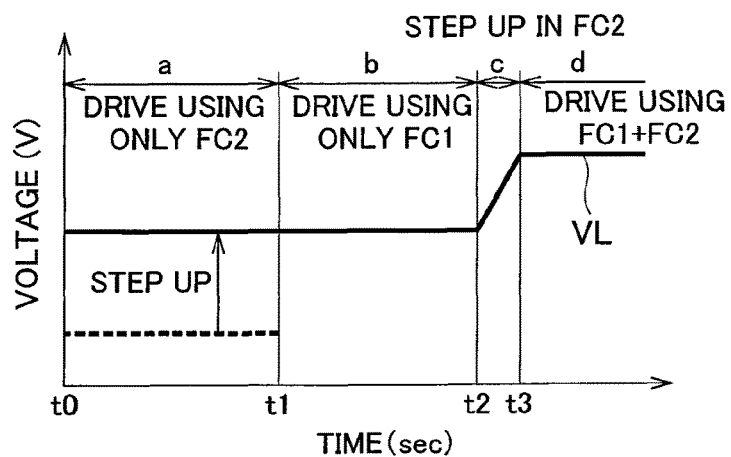
FIG. 3 is an example illustrating load voltage of the fuel cell system according to the first embodiment of the present invention.

FIG. 3 is an example illustrating voltage (load voltage) VL between both terminals of the load 70 from a point where the fuel cell system according to the first embodiment is started up to a point where the power of the first fuel cell stack FC1 and the second fuel cell stack FC2 is supplied to the load 70.

In a period a from time t0 to time t1, the electricity control device 40 steps up the output voltage (for example, 20 V) of the second fuel cell stack FC2 to voltage equal to the output voltage (for example, 50V) of the first fuel cell stack FC1 and outputs the stepped-up output voltage to the load 70. In a period b from time t1 to time t2, the electricity control device 40 switches the power source from the second fuel cell stack FC2 to the first fuel cell stack FC1 and outputs the output voltage of the first fuel cell stack FC1 to the load 70.

In a period c from time t2 to time t3, the electricity control device 40 steps up the output voltage of the second fuel cell stack FC2 to voltage equal to the sum of the output voltage of the first fuel cell stack FC1 and the output voltage of the second fuel cell stack FC2 and outputs the stepped-up output voltage. In a period d from time t3 and beyond, the electricity control device 40 switches the power source from the second fuel cell stack FC2 to the first fuel cell stack FC1 and the second fuel cell stack FC2 and outputs the output voltage of the first fuel cell stack FC1 and the second fuel cell stack FC2 connected in series to the load 70.

An example of operations of the fuel cell system according to the first embodiment from the system start-up to the point where the power of the first fuel cell stack FC1 and the second fuel cell stack FC2 is supplied to the load 70 are described below by using the flowchart of FIG. 4, with reference to FIGS. 5 to 10. The fuel cell system according to the first embodiment is started up by turning on an ignition switch of the vehicle in which the fuel cell system is mounted or by performing a similar operation, and a series of processes is started.

Figure 5:
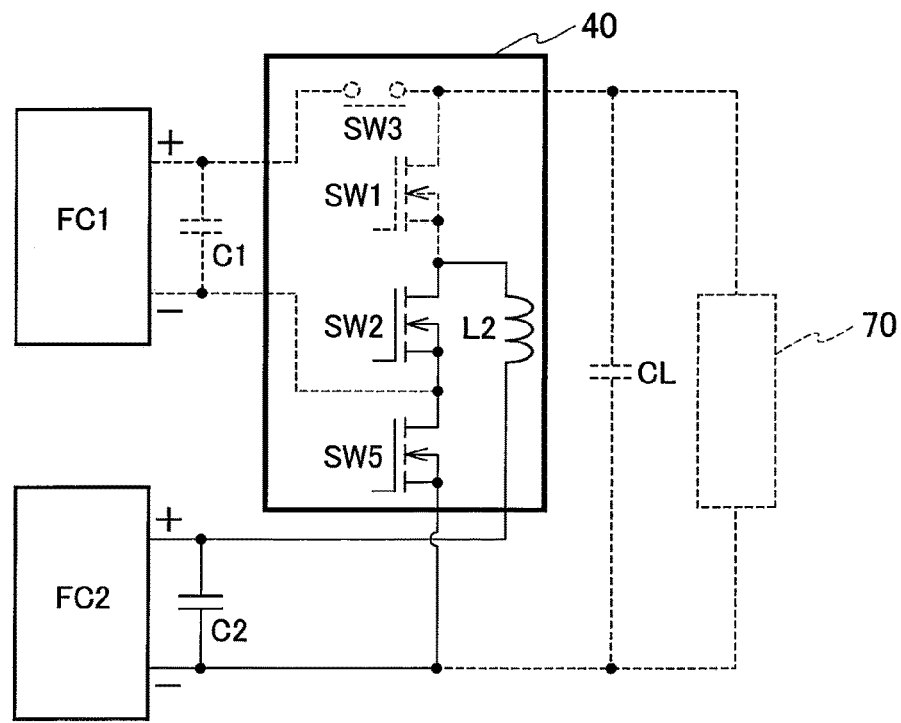
FIG. 5 is a circuit diagram explaining an operation in a start-up mode of the fuel cell system according to the first embodiment of the present invention.

First, in step S101, the processor 50 switches to the start-up mode when the temperature detected by each of the condition detectors 10, 20 is equal to or lower than a predetermined threshold. As illustrated in FIG. 5, in the start-up mode, the processor 50 controls the electricity control device 40 such that the switching elements SW1, SW3 are set to off and only the switching elements SW2, SW5 are set to on. Note that the broken lines in the circuit diagrams mean wires through which no current is flowing. In the start-up mode, the second fuel cell stack FC2 is heated by the heater 35. The fuel is made to flow into the second fuel cell stack FC2 when the temperature of the second fuel cell stack FC2 detected by the condition detector 20 reaches a predetermined threshold (for example, 300° C.). When electromotive force is generated in the second fuel cell stack FC2, there is formed a closed circuit in which a current circulates while flowing through the reactor L2. The second fuel cell stack FC2 can reduce the start-up time by using heat generated by itself in power generation.

Figure 6:
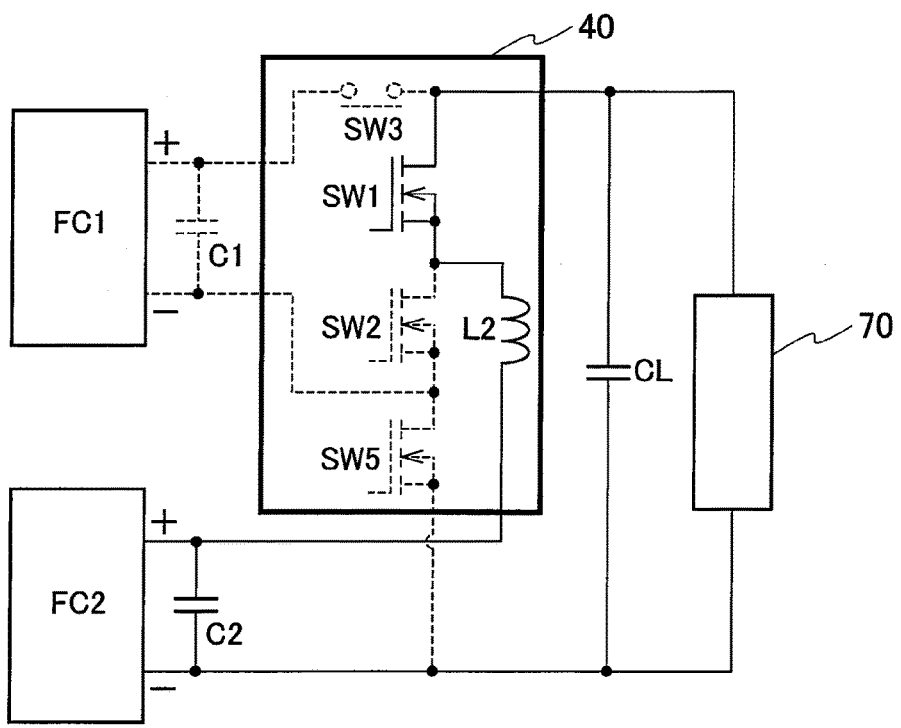
FIG. 6 is a circuit diagram explaining an operation in a low-output mode of the fuel cell system according to the first embodiment of the present invention.

In step S102, when the second fuel cell stack FC2 is started up, as illustrated in FIG. 6, the electricity control device 40 sets only the switching element SW1 to on according to the control of the processor 50 to connect only the second fuel cell stack FC2 to the load 70. Moreover, the exhaust passage 30 supplies the exhaust of the second fuel cell stack FC2 to the first fuel cell stack FC1 to heat the first fuel cell stack FC1 and promote the start-up of the first fuel cell stack FC1.

In step S103, the processor 50 switches to the step-up mode and controls the electricity control device 40 such that the voltage inputted from the second fuel cell stack FC2 is stepped up to voltage equal to the output voltage (open circuit voltage) of the first fuel cell stack FC1. The electricity control device 40 functions as a step-up chopper circuit by alternately turning on and off the switching elements SW2, SW5 while alternately turning off and on the switching element SW1 with the switching element SW3 being open. Specifically, the state of the electricity control device 40 is alternately switched between the state illustrated in FIG. 5 and the state illustrated in FIG. 6. The duty ratio of the electricity control device 40 is adjusted by the processor 50 and this enables the electricity control device 40 to smoothly step up the voltage of the second fuel cell stack FC2 to the voltage of the first fuel cell stack FC1.

In step S104, start-up of the first fuel cell stack FC1 is started when at least one of the output voltage and temperature of the first fuel cell stack FC1 reaches a predetermined threshold, and the power generation in the first fuel cell stack FC1 is promoted.

In step S105, the electricity control device 40 performs control of switching the power source connected to the load 70 from the second fuel cell stack FC2 to the first fuel cell stack FC1, according to the control of the processor 50. First, the processor 50 obtains at least one of the temperature and voltage of the first fuel cell stack FC1 and the second fuel cell stack FC2 from the condition detectors 10 and 20. Since the temperature and voltage of each fuel cell stack are in relation to each other, the processor 50 can grasp one of them by grasping the other.

Figure 7:
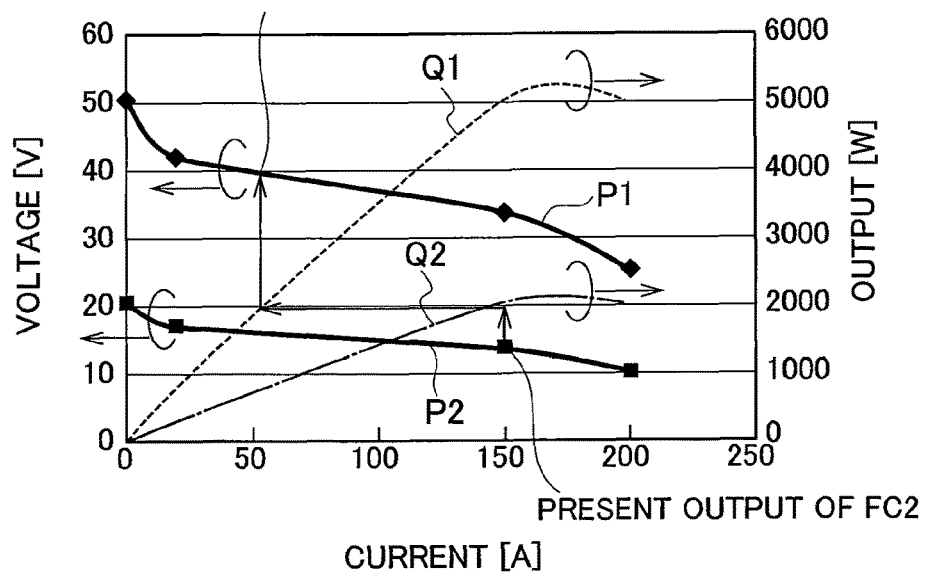
FIG. 7 is a diagram explaining a method of calculating target voltage of the fuel cell system according to the first embodiment of the present invention.

The processor 50 reads a current-voltage characteristic P1 corresponding to the present temperature of the first fuel cell stack FC1 and a current-voltage characteristic P2 corresponding to the present temperature of the second fuel cell stack FC2, from the storage 60. As illustrated in FIG. 7, the storage 60 stores output characteristics Q1, Q2 corresponding to the respective current voltage characteristics P1, P2. The processor 50 calculates an estimated voltage of the first fuel cell stack FC1 at which the output is to be equal to the present output of the second fuel cell stack FC2, based on the current-voltage characteristics P1, P2 and the output characteristics Q1, Q2, as illustrated in FIG. 7 by the arrows extending from the current-voltage characteristic P2 to the current-voltage characteristic P1.

The electricity control device 40 adjusts the duty ratio in the step-up mode according to the control by the processor 50 such that the load voltage becomes equal to target voltage which is the estimated voltage of the first fuel cell stack FC1. When the load voltage is stepped up to the target voltage and the step-up is completed, the processor 50 causes the processing to proceed to step S106.

Figure 8:
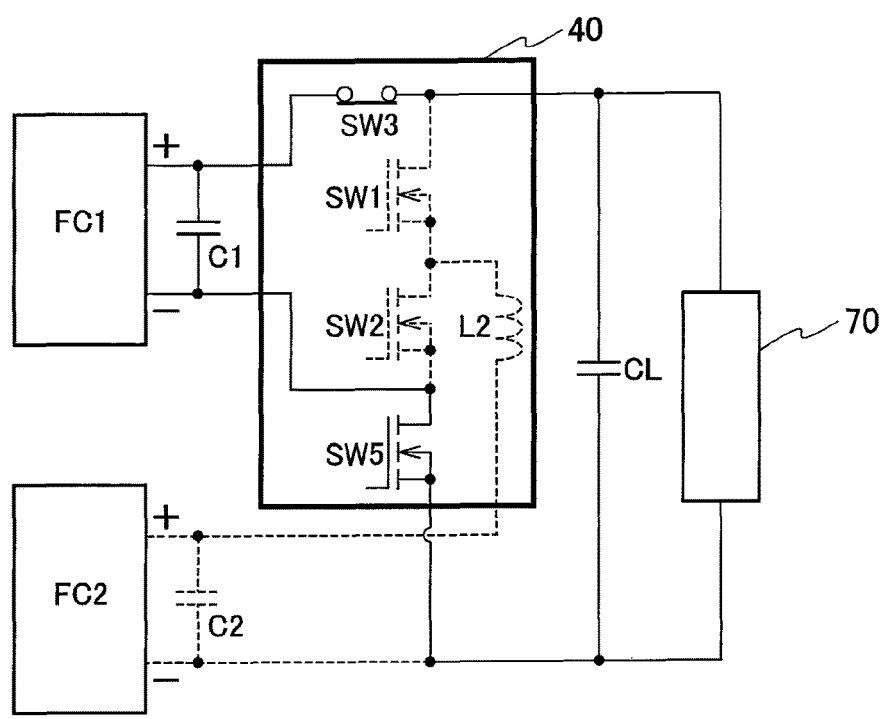
FIG. 8 is a circuit diagram explaining an operation in a normal mode of the fuel cell system according to the first embodiment of the present invention.

In step S106, the processor 50 switches to the normal mode. As illustrated in FIG. 8, in the normal mode, the electricity control device 40 sets the switching elements SW1, SW2 to off and sets only the switching elements SW3, SW5 to on to connect only the first fuel cell stack FC1 to the load 70. When the processor 50 switches to the normal mode, the second fuel cell stack FC2 is set to a shut-down state or a standby state in which predetermined temperature is maintained to suppress power generation.

In step S107, the processor 50 determines whether to switch to the high-output mode. The processor 50 may determine whether to switch to the high-output mode depending on, for example, whether target load voltage exceeds a predetermined threshold based on target speed and target output of the vehicle. When switching to the high-output mode, the processor 50 causes the processing to proceed to step S108. When not switching to the high-output mode, the processor 50 repeats the processing of step S106.

In step S108, the processor 50 temporarily switches to the step-up mode. In the step-up mode just before the switching to the high-output mode, the electricity control device 40 steps up the voltage inputted from the second fuel cell stack FC2 to voltage equal to the sum of the output voltage of the first fuel cell stack FC1 and the output voltage of the second fuel cell stack FC2. The electricity control device 40 functions as a step-up chopper circuit by alternately turning on and off the switching elements SW2, SW5 while alternately turning off and on the switching element SW1 with the switching element SW3 being open as illustrated in FIGS. 5 and 6. The duty ratio of the electricity control device 40 is thus adjusted by the processor 50 and this enables the electricity control device 40 to smoothly step up the output voltage of the second fuel cell stack FC2 to the sum of the voltage of the first fuel cell stack FC1 and the voltage of the second fuel cell stack FC2.

In step S109, the electricity control device 40 performs control of switching the power source connected to the load 70 from the first fuel cell stack FC1 to the first fuel cell stack FC1 and the second fuel cell stack FC2 connected in series, according to the control of the processor 50. The processor 50 obtains at least one of the temperature and voltage of the first fuel cell stack FC1 and the second fuel cell stack FC2 from the condition detectors 10 and 20. Moreover, the processor 50 reads the current-voltage characteristic P1 corresponding to the present temperature of the first fuel cell stack FC1 and the current-voltage characteristic P2 corresponding to the present temperature of the second fuel cell stack FC2, from the storage 60.

Figure 9:
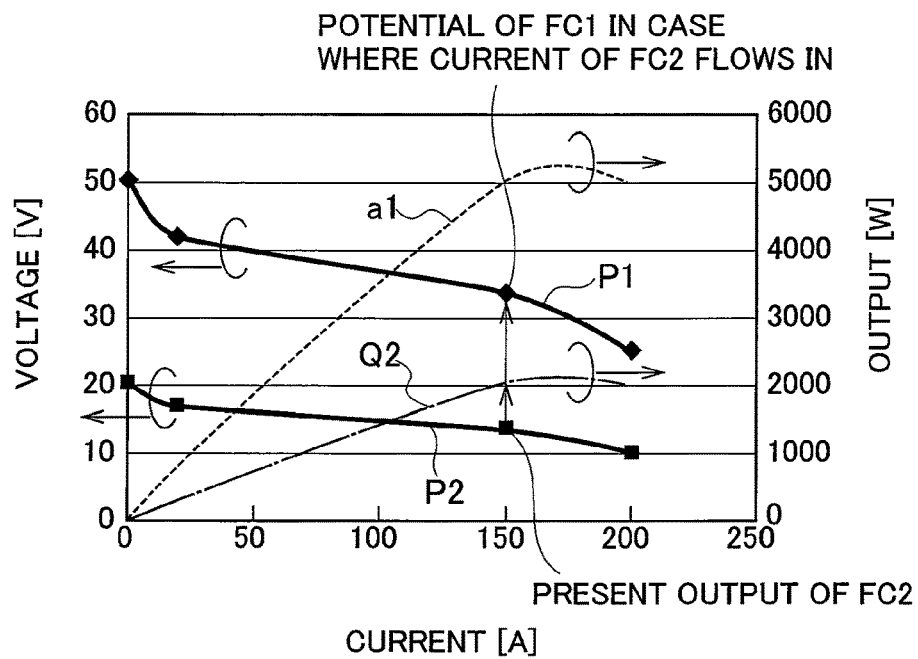
FIG. 9 is a circuit diagram explaining a method of calculating the target voltage of the fuel cell system according to the first embodiment of the present invention.

The processor 50 calculates the estimated voltage of the first fuel cell stack FC1 in the case where the current in the present second fuel cell stack FC2 flows, based on the current-voltage characteristics P1, P2, as illustrated in FIG. 9 by the arrow extending from the current-voltage characteristic P2 to the current-voltage characteristic P1.

The electricity control device 40 adjusts the duty ratio in the step-up mode according to the control by the processor 50 such that the load voltage becomes equal to target voltage which is the sum of the estimated voltage of the first fuel cell stack FC1 and the voltage of the second fuel cell stack FC2. When the load voltage is stepped up to the target voltage and the step-up is completed, the processor 50 causes the processing to proceed to step S110.

Figure 10:
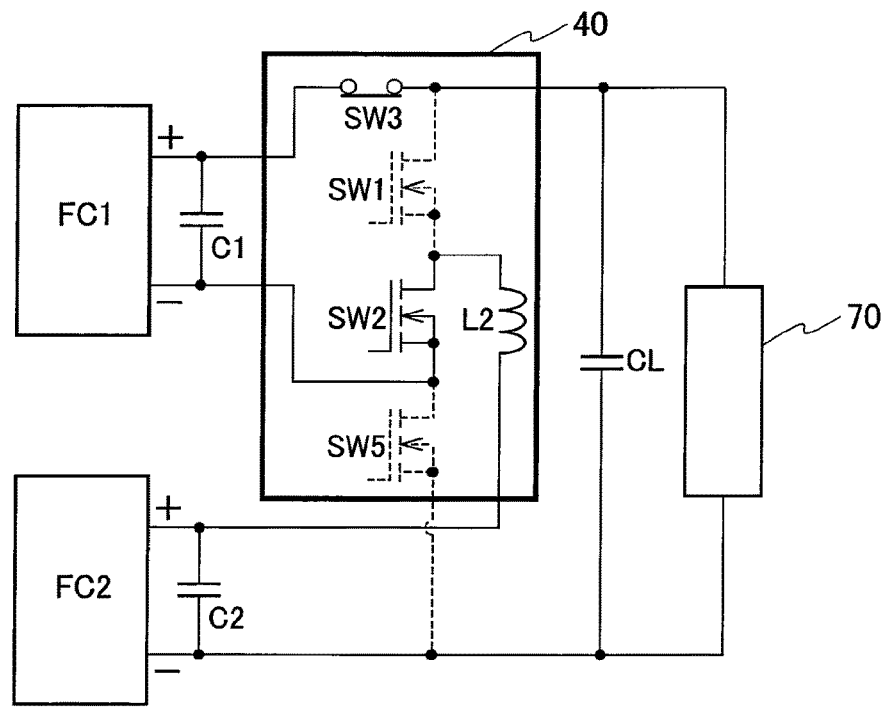
FIG. 10 is a circuit diagram explaining an operation in a high-output mode of the fuel cell system according to the first embodiment of the present invention.

In step S110, the processor 50 switches to the high-output mode. As illustrated in FIG. 10, in the high-output mode, the electricity control device 40 sets the switching elements SW1, SW5 to off and sets only the switching elements SW2, SW3 to on to connect the first fuel cell stack FC1 and the second fuel cell stack FC2 in series to the load 70.

As described above, in the fuel cell system according to the first embodiment, when the load voltage after the operation mode switching is to increase, the operation mode switching is performed via the step-up mode. In the fuel cell system according to the first embodiment, since the voltage of the second fuel cell stack FC2 can be stepped up and supplied to the load 70, the stability of the output voltage applied to the load 70 can be improved at low cost and high efficiency, without requiring an additional charging circuit or the like.

Figure 4:
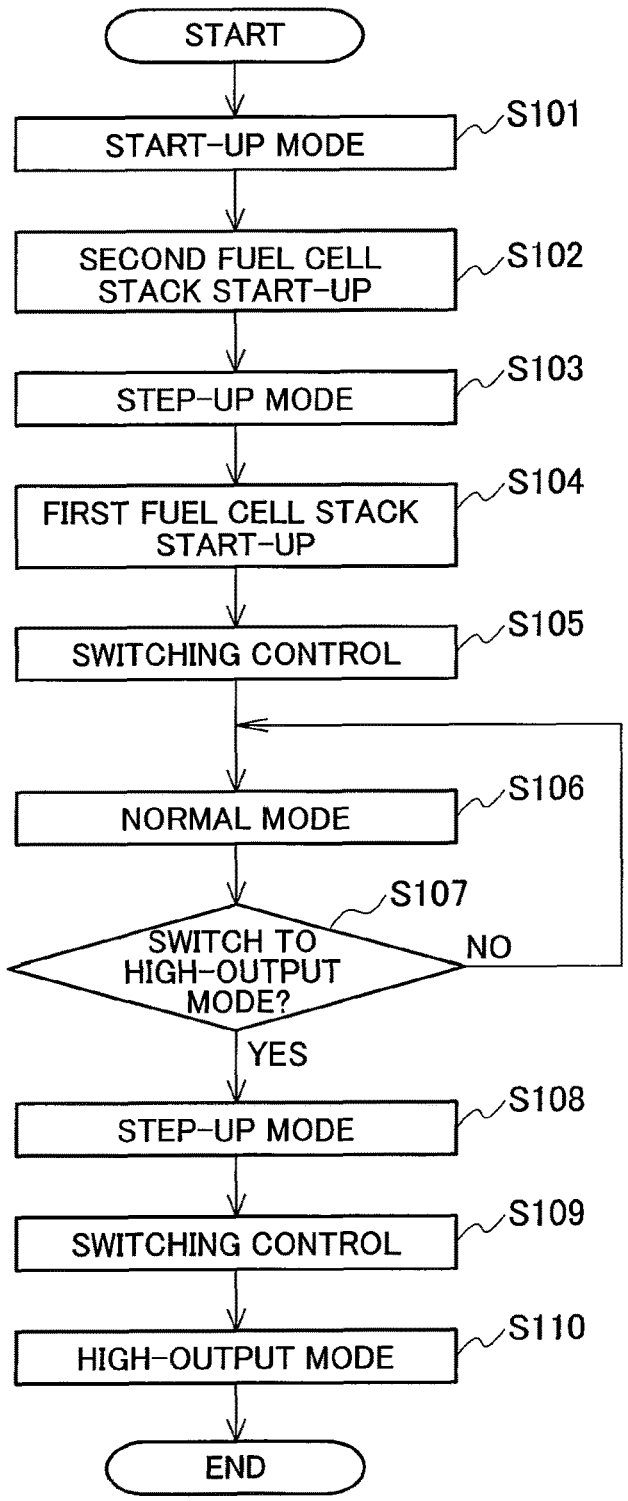
FIG. 4 is a flowchart explaining an example of operations of the fuel cell system according to the first embodiment of the present invention.

FIG. 11 is a simulation result of the load voltage VL in steps S103 to S106 in the flowchart of FIG. 4. The simulation is that in a period of transition from the state where the electricity control device 40 connects only the second fuel cell stack FC2 (pre-switching stack) to the load 70 to the state where the electricity control device 40 connects only the first fuel cell stack FC1 (post-switching stack) to the load 70. The load voltage VL is smoothly stepped up from the output voltage V2 of the second fuel cell stack FC2 (step-up stack) to voltage equal to the output voltage V1 of the first fuel cell stack FC1 in a period from time 0.05 seconds to 0.15 seconds. Thereafter, at time 0.25, the electricity control device 40 switches from the step-up mode to the normal mode and only the first fuel cell stack FC1 is thereby connected to the load 70.

Generally, when the stack connected to the load is switched, large voltage fluctuation occurs in the load at the moment of switching and there is thus a risk of causing a rush current or surge voltage. Meanwhile, in the fuel cell system according to the first embodiment, the voltage of the second fuel cell stack FC2 (step-up stack) is stepped up to voltage equal to the voltage of the first fuel cell stack FC1 and then the switching of the stack is performed. This can reduce the rush current and the surge voltage and improve the stability of the output voltage applied to the load 70.

FIG. 12 is a simulation result of the load voltage VL in steps S108 to S110 in the flowchart of FIG. 4. The simulation is that in a period of transition from the state where the electricity control device 40 connects only the first fuel cell stack FC1 (pre-switching stack) to the load 70 to the state where the electricity control device 40 connects the first fuel cell stack FC1 and the second fuel cell stack FC2 (post-switching stacks) in series to the load 70. The load voltage VL is smoothly stepped up from the output voltage V1 to voltage equal to the sum of the output voltage V1 and the output voltage V2 in a period from time 0.08 seconds to 0.11 seconds. Thereafter, at time 0.25, the electricity control device 40 switches from the step-up mode to the high-output mode and the first fuel cell stack FC1 and the second fuel cell stack FC2 are thereby connected in series to the load 70.

Generally, when the stacks are connected in series, there is a possibility that a current of one of the stacks flows into the other stack, thereby causing large fluctuation in the total output voltage. Meanwhile, in the fuel cell system according to the first embodiment, the voltage of the second fuel cell stack FC2 (step-up stack) is stepped up to voltage equal to the sum of the voltage of the first fuel cell stack FC1 and the voltage of the second fuel cell stack FC2 and then the first fuel cell stack FC1 and the second fuel cell stack FC2 are connected in series to the load 70. The fuel cell system according to the first embodiment can thereby reduce abrupt fluctuation in the load voltage and reduce unnecessary fuel consumption to improve output efficiency.

Moreover, in the fuel cell system according to the first embodiment, when the temperature of the first fuel cell stack FC1 and the temperature of the second fuel cell stack FC2 are equal to or lower than the predetermined threshold, the voltage of the second fuel cell stack FC2 is stepped up and supplied to the load 70. Supplying power from the second fuel cell stack FC2 with small capacity to the load 70 as described above can reduce the start-up time of the system.

Moreover, the fuel cell system according to the first embodiment is provided with the exhaust passage 30. Accordingly, an external burner or the like for heating the first fuel cell stack FC1 is unnecessary and the first fuel cell stack FC1 can be heated efficiently.

Furthermore, the fuel cell system according to the first embodiment suppresses power generation in the second fuel cell stack FC2 and promotes power generation in the first fuel cell stack FC1 when at least one of the temperature and voltage of the first fuel cell stack FC1 exceeds the predetermined threshold. This can reduce usage frequency of the second fuel cell stack FC2 necessary in every start-up operation and suppress degradation of the second fuel cell stack FC2. Moreover, the output efficiency can be improved by supplying the voltage of the first fuel cell stack FC1 with large capacity to the load 70.

Moreover, the fuel cell system according to the first embodiment steps up the voltage of the second fuel cell stack FC2 to voltage equal to the estimated voltage calculated based on the current-voltage characteristic P1 of the first fuel cell stack FC1. The fuel cell system according to the first embodiment can thereby reduce voltage fluctuation in the load 70 in the switching to the normal mode and suppress occurrence of the rush current and the surge voltage.

Furthermore, the fuel cell system according to the first embodiment can reduce the usage frequency of the second fuel cell stack FC2 necessary in every start-up operation and suppress degradation of the second fuel cell stack FC2 by switching to the high-output mode only when the target load voltage exceeds the predetermined threshold.

Moreover, the fuel cell system according to the first embodiment steps up the voltage of the second fuel cell stack FC2 to voltage equal to the target voltage calculated based on the current-voltage characteristics P1, P2 when switching to the high-output mode. The fuel cell system according to the first embodiment can thereby reduce the voltage fluctuation in the load 70 in the switching from the normal mode to the high-output mode and suppress occurrence of the rush current and the surge voltage.

Moreover, in the fuel cell system according to the first embodiment, at the start-up, the electricity control device 40 causes the current of the second fuel cell stack FC2 to circulate through the second fuel cell stack FC2 via the resistance (reactor). The second fuel cell stack FC2 can thereby reduce the start-up time by using the heat generated by itself in power generation.

Second Embodiment

Figure 13:
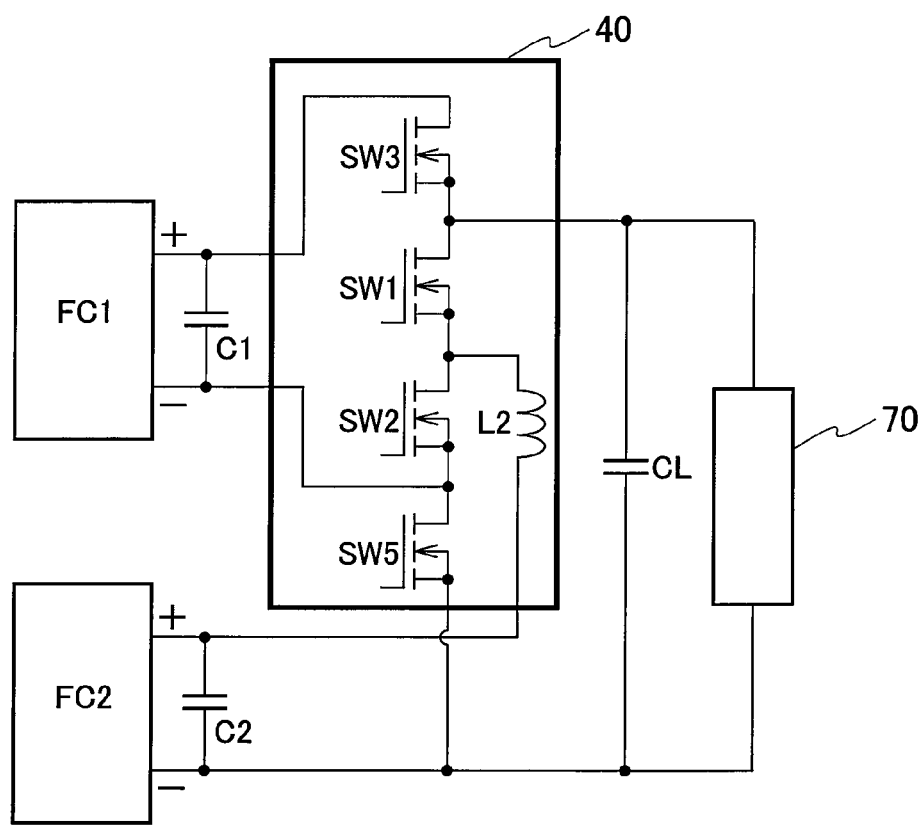
FIG. 13 is a circuit diagram explaining an electricity control device included in a fuel cell system according to a second embodiment of the present invention.

A fuel cell system according to a second embodiment of the present invention is different from that according to the first embodiment in that the switching element SW3 of the electricity control device 40 is configured by a semiconductor switching element instead of the mechanical switch as illustrated in FIG. 13. The other configurations, operations, and effects which are not described in the second embodiment are substantially the same as those in the first embodiment and overlapping description is omitted.

The switching element SW3 can be configured by, for example, a semiconductor switching element such as an insulated-gate field-effect transistor (IGFET), an insulated-gate bipolar transistor (IGBT), or a MOS-FET. The switching element SW3 is a power element which controls the power of the first fuel cell stack FC1 with large capacity.

In the fuel cell system according to the first embodiment, the switching element SW3 is configured by the mechanical switch. Thus, there is a possibility of degradation such as sticking due to arc, depending on usage conditions. Meanwhile, since the switching element SW3 included in the fuel cell system according to the second embodiment is configured by the semiconductor switching element, it is possible to reduce degradation and improve durability.

Third Embodiment

Figure 14:
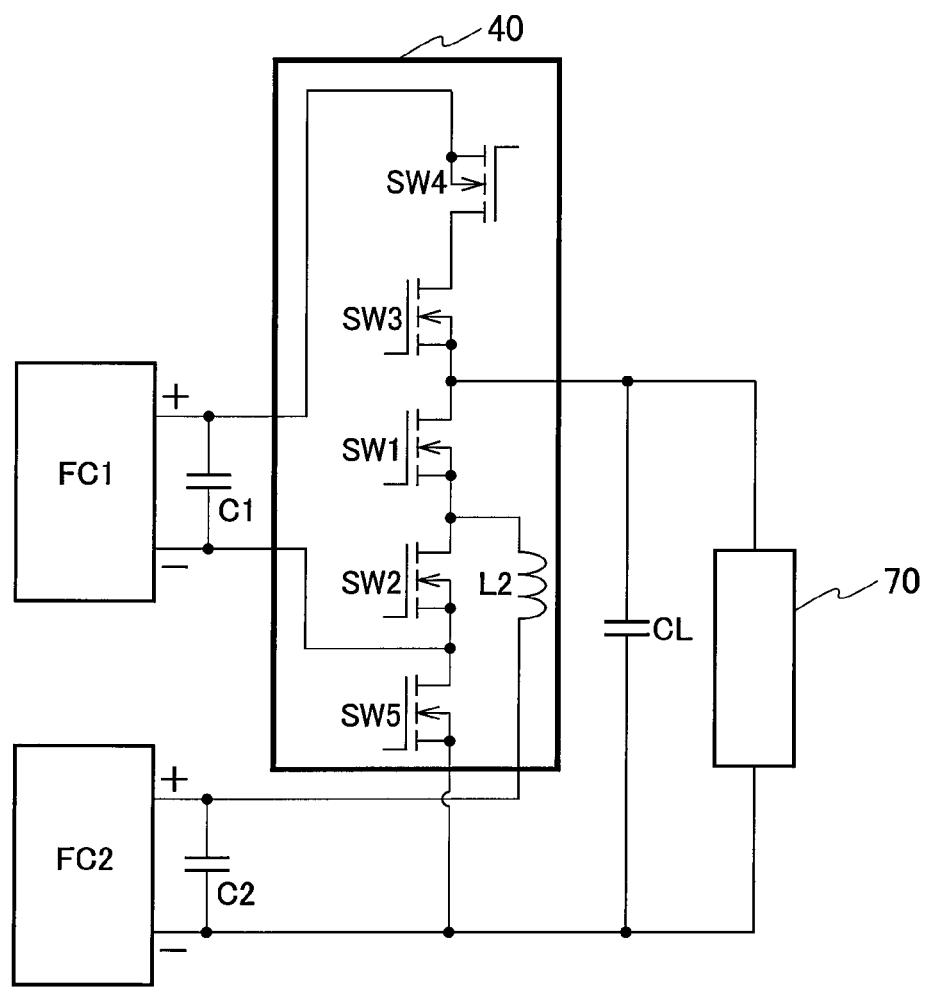
FIG. 14 is a circuit diagram explaining an electricity control device included in a fuel cell system according to a third embodiment of the present invention.

A fuel cell system according to a third embodiment of the present invention is different from that according to the second embodiment in that the electricity control device 40 is further provided with a switching element SW4 which is connected opposite to the switching element SW3 as illustrated in FIG. 14. The other configurations, operations, and effects which are not described in the third embodiment are substantially the same as those in the first and second embodiments and overlapping description is omitted.

The switching element SW4 can be configured by, for example, a semiconductor switching element such as an insulated-gate field-effect transistor (IGFET), an insulated-gate bipolar transistor (IGBT), or a MOS-FET like the other switching elements SW1 to SW3 and SW5. The switching element SW4 is a power element which controls the power of the first fuel cell stack FC1 with large capacity. The switching element SW4 is connected between the switching element SW3 and the first fuel cell stack FC1.

In the fuel cell system according to the second embodiment, a diode in the reverse direction to the first fuel cell stack FC1 is incorporated in the switching element SW3 configured by the semiconductor switching element. Accordingly, the voltage on the load 70 side cannot exceed the output voltage of the first fuel cell stack FC1 by flowing of the current into the first fuel cell stack FC1 side. Meanwhile, the fuel cell system according to the third embodiment is provided with the switching element SW4 connected in the reverse direction to the switching element SW3 and can thereby step up the load voltage to any voltage to which the electricity control device 40 is capable of stepping up the load voltage.

Note that the fuel cell system according to the third embodiment may include, instead of the switching elements SW3, SW4, a bidirectional switching element as a configuration in which the switching elements SW3, SW4 are integrated. The bidirectional switching element is configured by, for example, a reverse blocking IGBT or the like.

Fourth Embodiment

Figure 15:
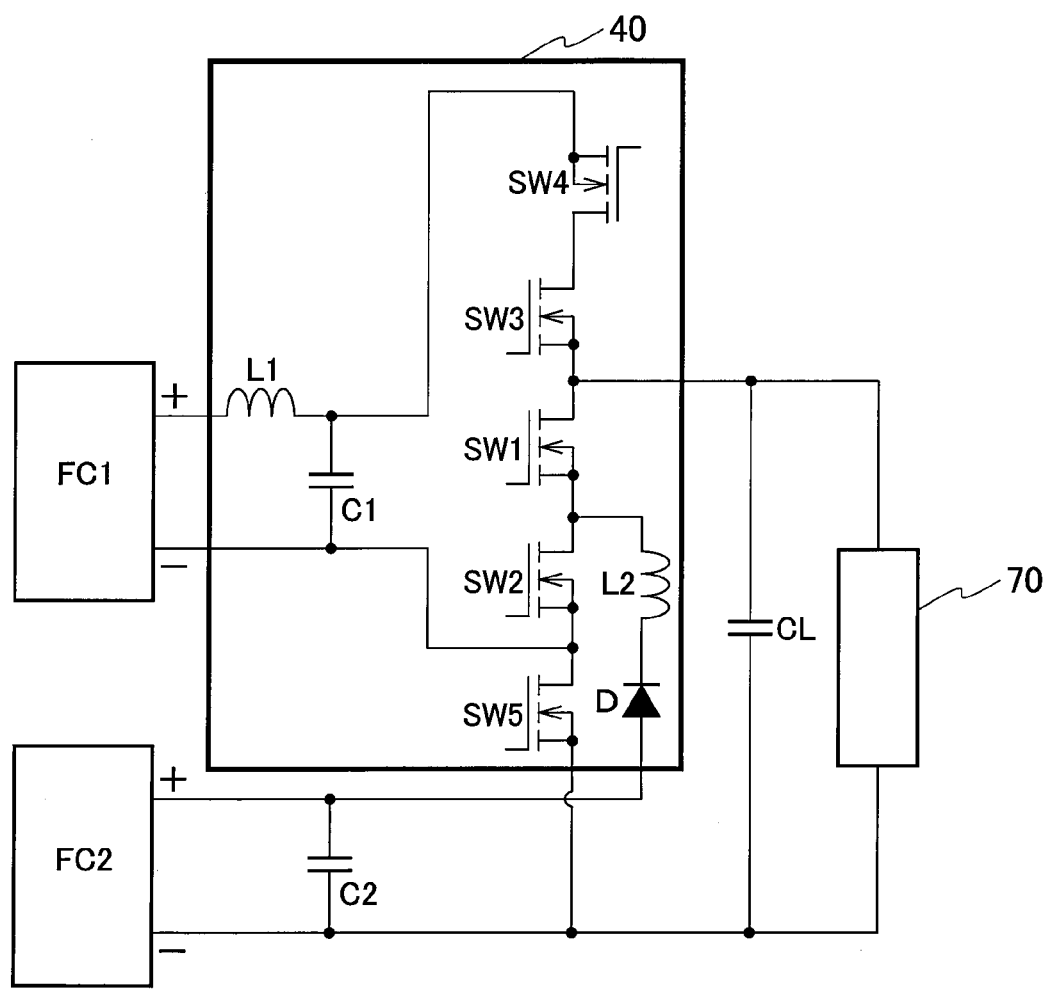
FIG. 15 is a circuit diagram explaining an electricity control device included in a fuel cell system according to a fourth embodiment of the present invention.

A fuel cell system according to a fourth embodiment of the present invention is different from that in the third embodiment in that the electricity control device 40 further includes a reactor L1 and a diode D as illustrated in FIG. 15. The other configurations, operations, and effects which are not described in the fourth embodiment are substantially the same as those in the first to third embodiments and overlapping description is omitted.

The reactor L1 is connected between the positive electrode of the first fuel cell stack FC1 and the positive electrode terminal of the capacitor C1 in series. The diode D is connected between the reactor L2 and the positive electrode terminal of the capacitor C2 in series. The diode D is connected in the forward direction to the output of the second fuel cell stack FC2.

Figure 16:
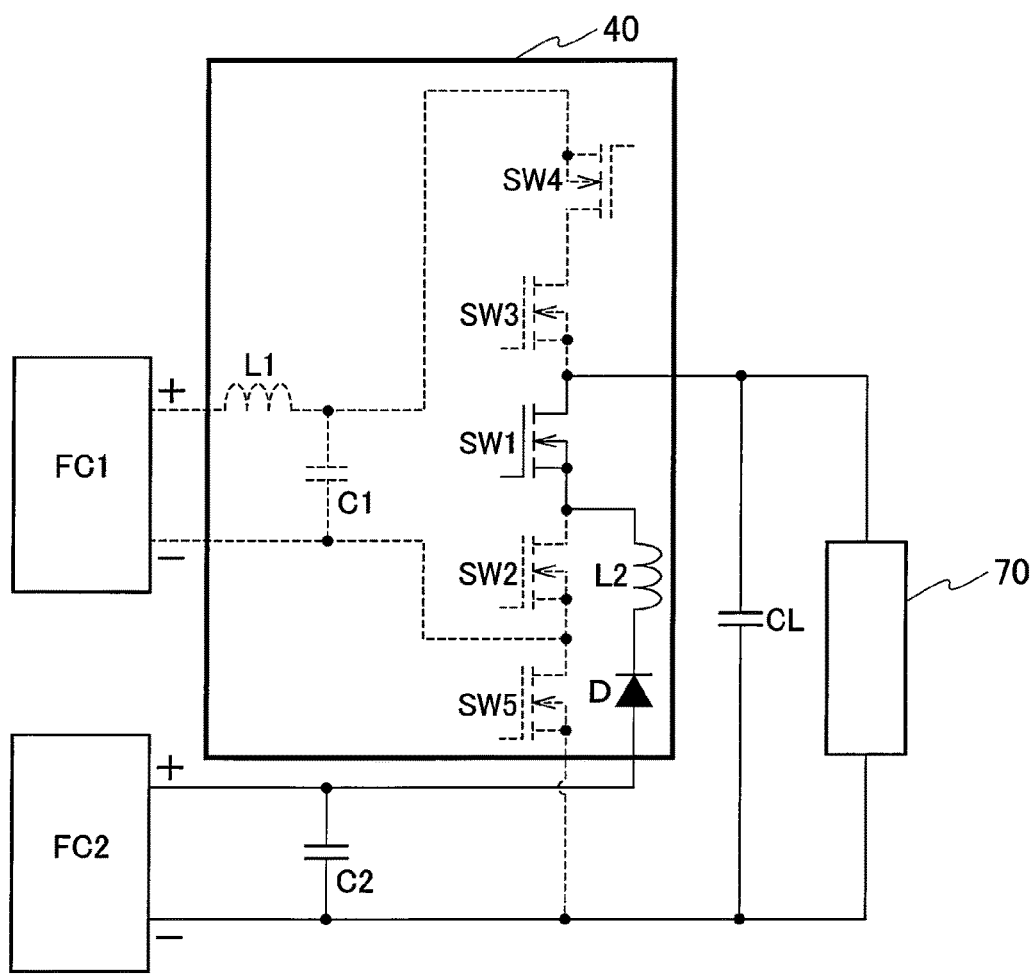
FIG. 16 is a circuit diagram explaining an operation in a low-output mode of the fuel cell system according to the fourth embodiment of the present invention.

As illustrated in FIG. 16, in a low-output mode, the electricity control device 40 sets the switching elements SW2 to SW5 to off and sets only the switching element SW1 to on to connect only the second fuel cell stack FC2 to the load 70.

Figure 17:
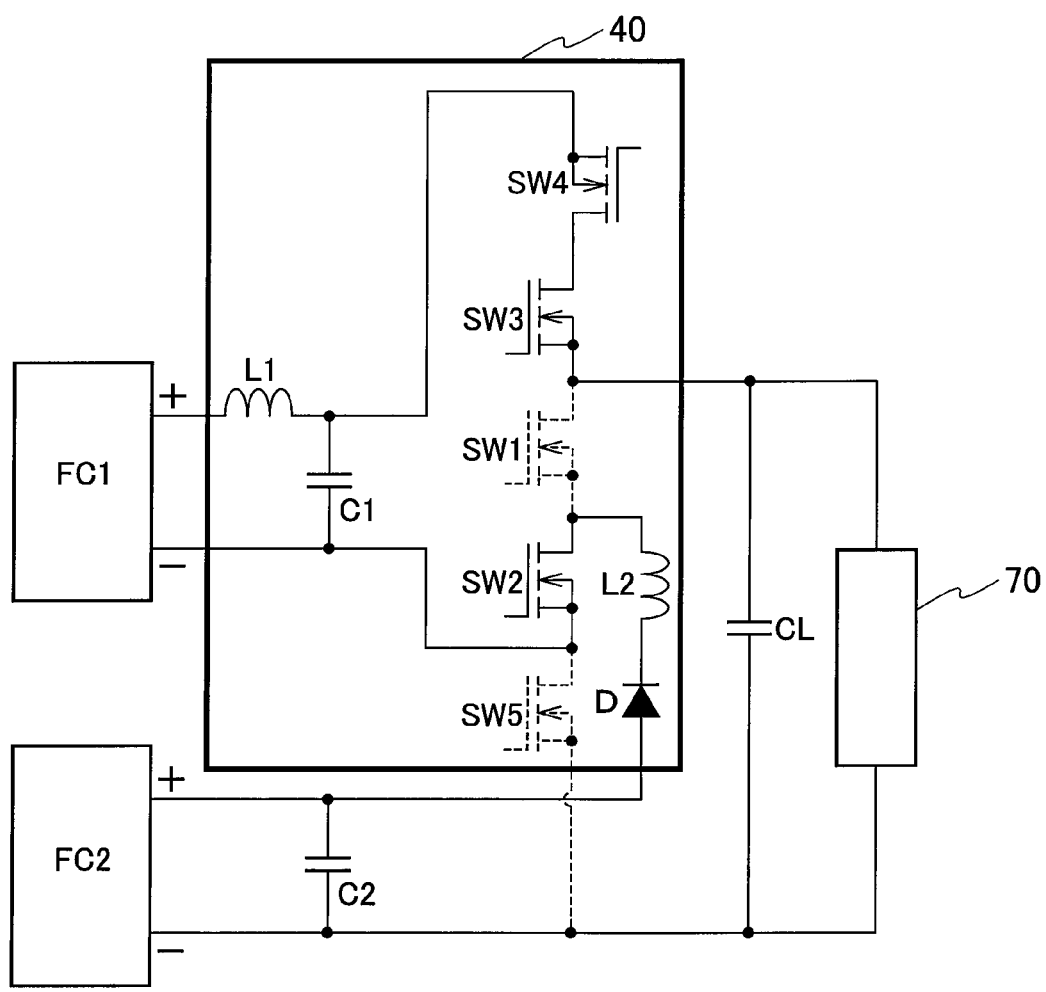
FIG. 17 is a circuit diagram explaining an operation in a high-output mode of the fuel cell system according to the fourth embodiment of the present invention.

In the step-up mode, the electricity control device 40 alternately switches at high speed between the low-output mode in which the electricity control device 40 connects only the second fuel cell stack FC2 to the load 70 and the high-output mode in which the electricity control device 40 connects the first fuel cell stack FC1 and the second fuel cell stack FC2 in series to the load 70 as illustrated in FIG. 17. Specifically, the electricity control device 40 alternately switches between the state illustrated in FIG. 16 and the state illustrated in FIG. 17. By adjusting the duty ratio of switching, the electricity control device 40 can control the load voltage to be any voltage from the output voltage of the second fuel cell stack FC2 to the sum of the output voltage of the first fuel cell stack FC1 and the output voltage of the second fuel cell stack FC2.

For example, in the fuel cell system according to the first embodiment, in the switching from the low-output mode or the normal mode to the high-output mode, energy stored in the capacitor C1 and the like may cause a current to abruptly flow into the first fuel cell stack FC1 or the second fuel cell stack FC2 depending on usage conditions. When the current abruptly changes in the fuel cell stack, there is a possibility that the amount of fuel to be supplied to the fuel cell stack cannot follow this change and the fuel flowing into the fuel cell stack becomes insufficient. In this case, an insufficient amount of fuel leads to failure and deterioration of the fuel cell stack due to oxidation of the fuel electrode. Accordingly, an excessive amount of fuel needs to be supplied and this may cause decrease in the output efficiency with respect to the fuel.

Since the fuel cell system according to the fourth embodiment includes the reactor L1, it is possible to suppress abrupt flow of the current into the first fuel cell stack FC1 in the switching to the state where the first fuel cell stack FC1 and the second fuel cell stack FC2 are connected in series to the load 70. Specifically, since the electricity control device 40 performs control in the step-up mode such that charges stored in the capacitor C1 and the like are not instantaneously consumed and the reactor L1 is gradually charged, abrupt change in the current flowing in the first fuel cell stack FC1 is suppressed. Since the electricity control device 40 can arbitrarily control the rate of stepping up the load voltage depending on response speed of control of supplying the fuel to the fuel cell stack, it is possible to reduce failure and degradation of the fuel cell stack and improve the output efficiency.

In the fuel cell system according to the first embodiment, the current of the first fuel cell stack FC1 may flow into the second fuel cell stack FC2 in the switching depending on output conditions. Meanwhile, since the fuel cell system according to the fourth embodiment includes the diode D, it is possible to prevent the current from flowing into the second fuel cell stack FC2.

Figure 18:
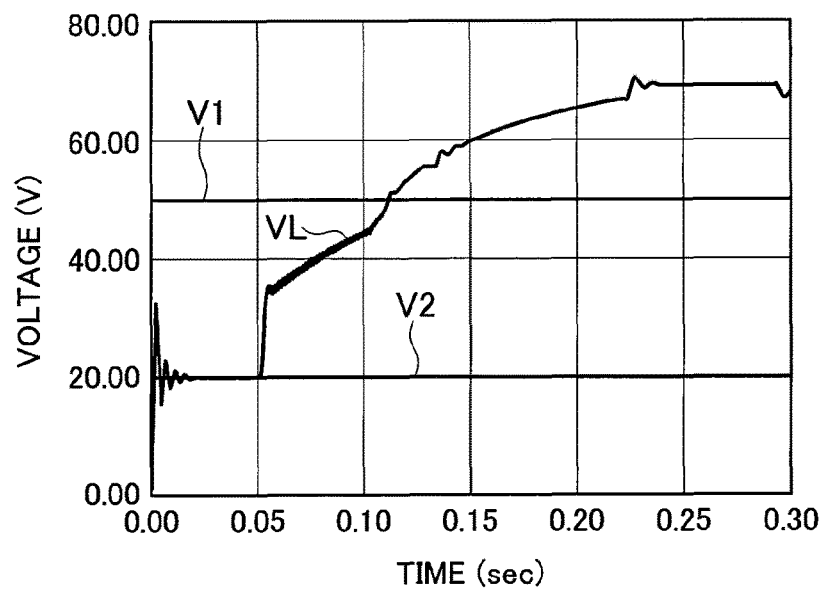
FIG. 18 is a simulation result of load voltage of the fuel cell system according to the fourth embodiment of the present invention.

FIG. 18 is a simulation result of the load voltage VL in the transition from the low-output mode to the high-output mode via the step-up mode. In the step-up mode from time 0.05 seconds to time 0.23 seconds, the load voltage VL is stepped up from the output voltage V2 of the second fuel cell stack FC2 (pre-switching stack, step-up stack) to the sum of the output voltage V1 of the first fuel cell stack FC1 and the output voltage V2 of the second fuel cell stack FC2 (post-switching stacks). From this simulation result, it is found that the change rate of the current flowing in the first fuel cell stack FC1 can be reduced.

Fifth Embodiment

Figure 19:
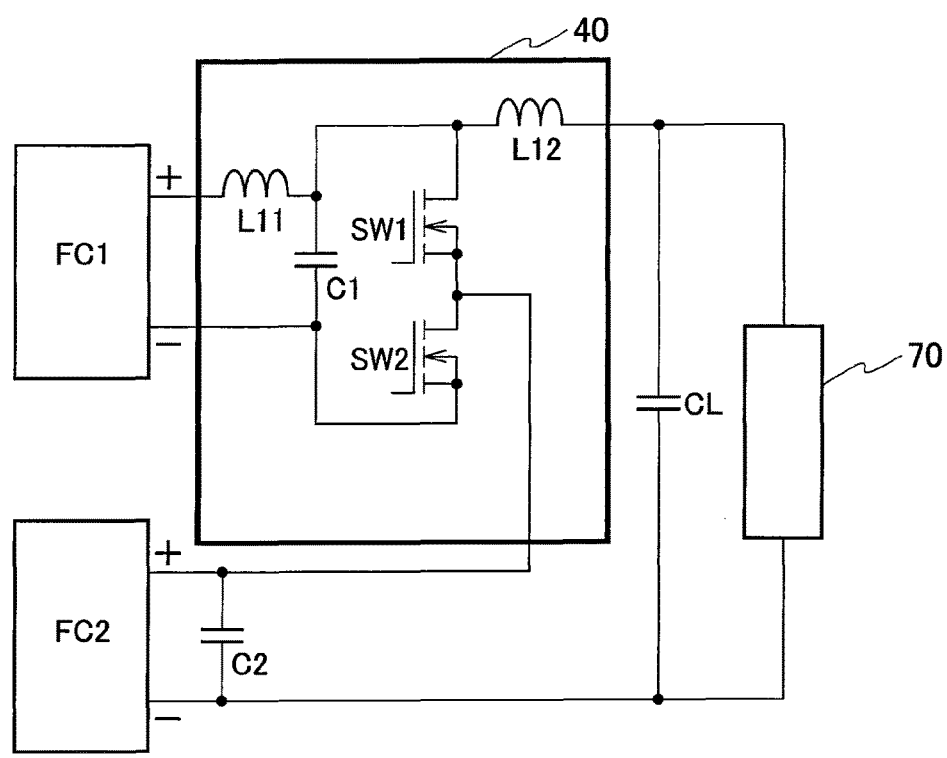
FIG. 19 is a circuit diagram explaining an electricity control device included in a fuel cell system according to a fifth embodiment of the present invention.

A fuel cell system according to a fifth embodiment of the present invention is different from those according to the first to fourth embodiment in that the configuration of the electricity control device 40 is simplified as illustrated in FIG. 19 and the number of operation modes is reduced. The other configurations, operations, and effects which are not described in the fifth embodiment are substantially the same as those in the first to fourth embodiments and overlapping description is omitted.

The input side of the electricity control device 40 is connected to the positive electrode and the negative electrode of the first fuel cell stack FC1 and the positive electrode of the second fuel cell stack FC2. The output side of the electricity control device 40 is connected to the positive electrode terminal of the load 70. The negative electrode terminal of the load 70 is connected to the negative electrode of the second fuel cell stack FC2.

The electricity control device 40 includes reactors L11, L12 connected in series in this order between the positive electrode of the first fuel cell stack FC1 and the positive electrode terminal of the load 70 and also includes the switching elements SW1, SW2 connected in series in this order between the contact point of the reactors L11, L12 and the negative electrode of the first fuel cell stack FC1. Moreover, the electricity control device 40 includes the capacitor C1 connected in parallel to the switching elements SW1, SW2.

The fuel cell system according to the fifth embodiment has the low-output mode, the step-up mode, and the high-output mode as the operation modes and does not have the start-up mode and the normal mode. In the low-output mode, the processor 50 controls the electricity control device 40 such that the switching element SW2 is set to off and only the switching element SW1 is set to on. Moreover, in the high-output mode, the processor 50 controls the electricity control device 40 such that the switching element SW1 is set to off and only the switching element SW2 is set to on.

In the step-up mode, the electricity control device 40 functions as a step-up chopper circuit by alternately turning on and off the switching element SW1 while turning off and on the switching element SW2 according to the control of the processor 50. By adjusting the duty ratio of switching, the electricity control device 40 can control the load voltage VL to be any voltage from the output voltage of the second fuel cell stack FC2 (we-switching stack, step-up stack) to the sum of the output voltage of the first fuel cell stack FC1 and the output voltage of the second fuel cell stack FC2 (post-switching stacks).

Figure 20:
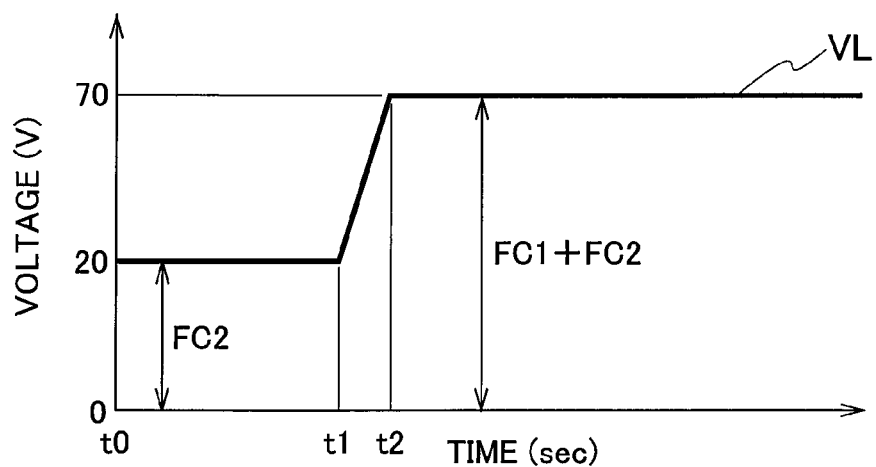
FIG. 20 is an example illustrating load voltage of the fuel cell system according to the fifth embodiment of the present invention.

FIG. 20 is an example illustrating the load voltage VL from a point where the fuel cell system according to the fifth embodiment is started up to a point where the power of the first fuel cell stack FC1 and the second fuel cell stack FC2 is supplied to the load 70.

In a period from time t0 to t1, as the low-output mode, the electricity control device 40 connects only the second fuel cell stack FC2 to the load 70. In a period from time t1 to t2, as the step-up mode, the electricity control device 40 alternately switches between the state where the electricity control device 40 connects only the first fuel cell stack FC1 to the load 70 and the state where the electricity control device 40 connects only the second fuel cell stack FC2 to the load 70 to step up the load voltage VL.

Figure 21:
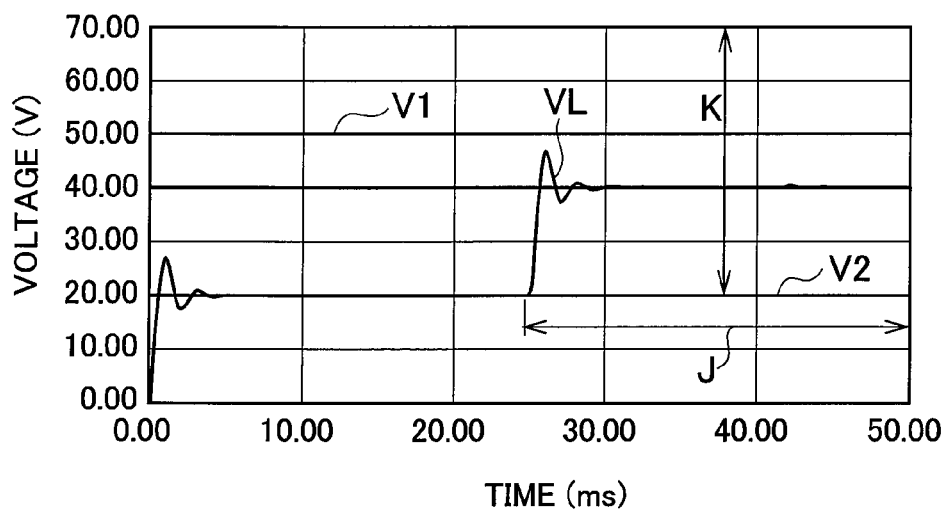
FIG. 21 is a simulation result of the load voltage of the fuel cell system according to the fifth embodiment of the present invention.

FIG. 21 is a simulation result of the load voltage VL in the low-output mode and the step-up mode. In a section J from time 25 ms, the electricity control device 40 operates in the step-up mode. As illustrated in FIG. 21, by adjusting the duty ratio of switching, the load voltage VL can be stepped up to be any voltage within a range K from the output voltage V2 of the second fuel cell stack FC2 to the sum of the output voltage V1 of the first fuel cell stack FC1 and the output voltage V2.

In the fuel cell system according to the fifth embodiment, the manufacturing cost and the processing load in the step-up can be reduced by reducing the number of switching elements. Moreover, since the fuel cell system according to the fifth embodiment includes the reactor L11 having one end connected to the positive electrode of the first fuel cell stack FC1, it is possible to suppress abrupt flow of the current in the first fuel cell stack FC1 in the switching to the state where the first fuel cell stack FC1 and the second fuel cell stack FC2 are connected in series to the load 70.

Other Embodiments

Although the present invention has been described above by using the first to fifth embodiments, it should not be understood that the description and drawings forming part of this disclosure limit the present invention. From this disclosure, various alternative embodiments, examples, and operations techniques will be found by those skilled in the art.

For example, in the fuel cell system according to the first to fifth embodiments, the first fuel cell stack FC1 and the second fuel cell stack FC2 may be interchanged. Specifically, only the first fuel cell stack FC1 is connected to the load 70 in the low-output mode and only the second fuel cell stack FC2 is connected to the load 70 in the normal mode.

Particularly, the change rate of the load voltage can be reduced in the fuel cell system according to the fourth embodiment by configuring the fuel cell system such that the voltage of the first fuel cell stack FC1 (step-up stack) is stepped up and supplied to the load 70. This is described more specifically. In the transition from the normal mode to the high-output mode, the fuel cell system according to the fourth embodiment needs to temporarily switch to the step-up mode using the second fuel cell stack FC2 with low output voltage, and the output of the electricity control device 40 thereby falls.

Meanwhile, when the fuel cell system steps up the load voltage by alternately switching at high speed between the state where only the first fuel cell stack FC1 (pre-switching stack) is connected to the load 70 and the state where the first fuel cell stack FC1 and the second fuel cell stack FC2 (post-switching stacks) are connected in series to the load 70, the output of the electricity control device 40 can be prevented from falling greatly, Moreover, the present invention includes various embodiments and the like which are not described herein such as configurations mutually adopting the configurations described in the first to fifth embodiments, as a matter of course. Accordingly, the technical scope of the present invention should be determined only by the matters specifying the invention in the scope of claims regarded as appropriate based on the aforementioned description.

INDUSTRIAL APPLICABILITY

The present invention can provide a fuel cell system in which an electricity control device has a configuration capable of stepping up the voltage of a fuel cell stack and which can thereby improve the stability of the output voltage.

REFERENCE SIGNS LIST 30 exhaust passage
40 electricity control device
70 load
FC1 first fuel cell stack
FC2 second fuel cell stack
P1, P2 current-voltage characteristic

The invention claimed is:

1. A fuel cell system comprising:
a first fuel cell stack;
a second fuel cell stack with lower output voltage than the first fuel cell stack, a pre-switching stack configured by the first fuel cell stack or the second fuel cell stack, a step-up stack configured by the first fuel cell stack or the second fuel cell stack, a post-switching stack configured by at least the first fuel cell stack; and
an electricity control device configured to step up voltage of the step-up stack with the pre-switching stack connected to a load and then switch to a connection state where the post-switching stack is connected to the load.

2. The fuel cell system according to claim 1, wherein the pre-switching stack and the step-up stack are configured by the second fuel cell stack, and
the post-switching stack is configured by the first fuel cell stack.

3. The fuel cell system according to claim 1, wherein the pre-switching stack is configured by the first fuel cell stack,
the step-up stack is configured by the first fuel cell stack or the second fuel cell stack, and
the post-switching stack is configured by the first fuel cell stack and the second fuel cell stack connected in series.

4. The fuel cell system according to claim 1, wherein the pre-switching stack and the step-up stack are configured by the second fuel cell stack, and
the post-switching stack is configured by the first fuel cell stack and the second fuel cell stack connected in series.

5. The fuel cell system according to claim 2, wherein voltage of the second fuel cell stack is stepped up to voltage equal to voltage of the first fuel cell stack and supplied to the load, when temperature of the first fuel cell stack and temperature of the second fuel cell stack are each equal to or lower than a predetermined threshold.

6. The fuel cell system according to claim 1, further comprising an exhaust passage configured to heat the first fuel cell stack by supplying exhaust of the second fuel cell stack to the first fuel cell stack.

7. The fuel cell system according to claim 1, wherein when at least one of temperature and voltage of the first fuel cell stack exceeds a predetermined threshold, power generation in the second fuel cell stack is suppressed and power generation in the first fuel cell stack is promoted.

8. The fuel cell system according to claim 2, wherein the electricity control device steps up voltage of the second fuel cell stack such that voltage supplied to the load becomes equal to estimated voltage calculated based on a current-voltage characteristic of the first fuel cell stack.

9. The fuel cell system according to claim 3, wherein the electricity control device switches to a high-output mode when target load voltage exceeds a predetermined threshold.

10. The fuel cell system according to claim 9, wherein in the switching to the high-output mode, the electricity control device steps up voltage of the second fuel cell stack such that voltage supplied to the load becomes equal to sum of the voltage of the second fuel cell stack and estimated voltage calculated based on a current-voltage characteristic of the first fuel cell stack.

11. The fuel cell system according to claim 4, wherein the electricity control device steps up voltage of the second fuel cell stack by alternately switching between a state where the electricity control device connects the second fuel cell stack to the load and a state where the electricity control device connects the first fuel cell stack and the second fuel cell stack in series to the load.

12. The fuel cell system according to claim 3, wherein the electricity control device steps up voltage of the first fuel cell stack by alternately switching between a state where the electricity control device connects the first fuel cell stack to the load and a state where the electricity control device connects the first fuel cell stack and the second fuel cell stack in series to the load.

13. The fuel cell system according to claim 1, wherein in system start-up, fuel is made to flow into the second fuel cell stack when temperature reaches a predetermined threshold, and the electricity control device causes a current of the second fuel cell stack to circulate through the second fuel cell stack via a resistance.

* * * * *